Figure 1:
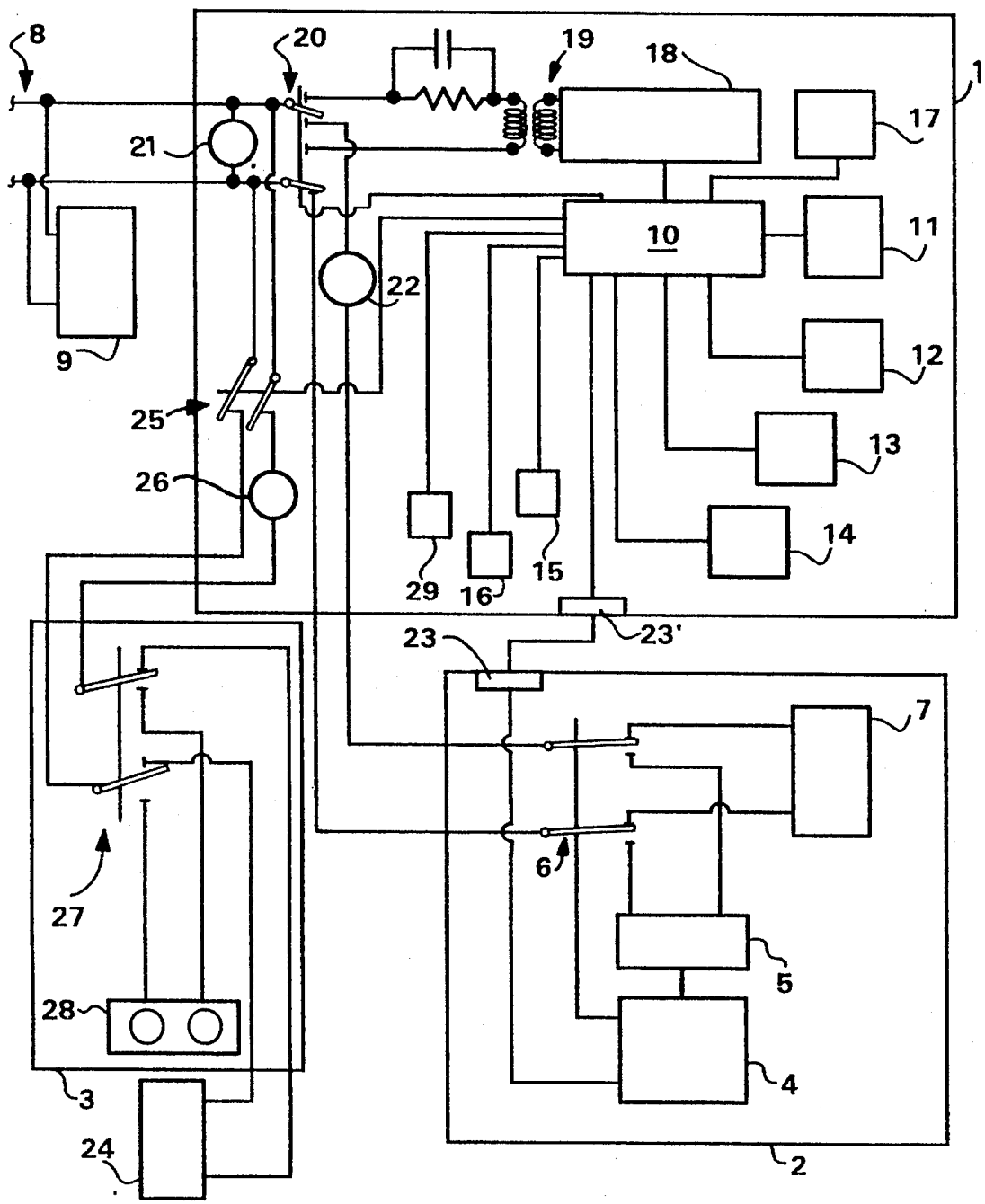

United States Patent [19]

Charbonnier

[11] Patent Number: 5,574,571
[45] Date of Patent: Nov. 12, 1996

[54] FACSIMILE MACHINE WITH DIVERSE COMMUNICATION FACILITIES

[75] Inventor: Philippe Charbonnier, Maisons Laffitte, France

[73] Assignee: Societe d'Applications Generales d'Electricite et de Mecanique SAGEM, France

[21] Appl. No.: 98,405

[22] PCT Filed: Feb. 12, 1992

[86] PCT No.: PCT/FR92/00132

§ 371 Date: Aug. 5, 1993

§ 102(e) Date: Aug. 5, 1993

[87] PCT Pub. No.: WO92/14335

PCT Pub. Date: Aug. 20, 1992

[30] Foreign Application Priority Data

Feb. 12, 1991 [FR] France .................................. 91 01586

[51] Int. Cl.⁶ .................................. H04N 1/00; H04N 1/40
[52] U.S. Cl. .......................... 358/400; 358/468; 358/434; 358/442; 379/100
[58] Field of Search .................................. 358/442, 468, 358/400, 402, 434, 435, 439, 500, 444, 440, 401, 406; 379/100, 96, 93

[56] References Cited

U.S. PATENT DOCUMENTS

| | | | |
|---|---|---|---|
| 4,652,933 | 3/1987 | Koshiishi | 358/442 |
| 4,850,008 | 7/1989 | Berg et al. | 379/100 |
| 4,916,732 | 4/1990 | Kotani et al. | 379/100 |
| 4,991,200 | 2/1991 | Lin | 379/100 |
| 5,027,385 | 6/1991 | Nakagawa et al. | 379/100 |
| 5,062,133 | 10/1991 | Melrose | 379/94 |
| 5,151,972 | 9/1992 | Lorenz et al. | 379/100 |
| 5,193,110 | 3/1993 | Jones et al. | 379/93 |
| 5,228,128 | 7/1993 | Kim | 358/442 |
| 5,255,312 | 10/1993 | Koshiishi | 358/442 |
| 5,471,317 | 11/1995 | Charbonnier | 358/434 |

FOREIGN PATENT DOCUMENTS

| | | |
|---|---|---|
| 409718 | 1/1991 | European Pat. Off. . |
| 2642925 | 10/1990 | France . |
| 2213681 | 8/1989 | United Kingdom . |
| WO9004299 | 4/1990 | WIPO . |

*Primary Examiner*—Edward L. Coles, Sr.
*Assistant Examiner*—Fan Lee
*Attorney, Agent, or Firm*—Graham & James LLP

[57] ABSTRACT

The facsimile machine comprises a processor (10), means (20) for connection to a telephone line (8), means (20) for connection to a main telephone (7), a ring detector (21), a module (17) for recognition of the nature of incoming calls, and a printer (14). It comprises means (23'; 26) for direct connection to at least one terminal (2; 3) and means (20; 25) for connection of the terminal (2; 3) to the telephone line (8), and it is adapted, in case of connection between the terminal and the telephone line, to note events on the line and therefore recognize their nature, and thus to switch the line (8) to the facsimile machine or the terminal (2; 3) as a function of the nature of the events. The terminal may be a videotex terminal (2) or an answering/recording machine (3). These two terminals may both be connected to the facsimile machine.

15 Claims, 2 Drawing Sheets

FACSIMILE MACHINE WITH DIVERSE COMMUNICATION FACILITIES

The present invention relates to a facsimile machine comprising a processor, means for connection to a telephone line, means for connection to at least one main telephone station, a ring detector, a module for recognizing the nature of incoming calls, and a printer.

Facsimile machines are today a part of conventional office equipment without which it is difficult to operate. Their use has furthermore already expanded into private homes. In parallel with these facsimile machines users have other equipment such as videotex terminals, and telephone answering and message recording machines, to say nothing of the numerous telephones which are almost indispensable.

Conventional facsimile machines of the above type have means for recognizing the nature of incoming calls, enabling them, in combination with other means, to distinguish facsimile transmissions from telephone calls and to switch the telephone line either to the facsimile machine or to the telephone. These facsimile machines are also provided with a printer which, among other functions, permits them, in local mode, to serve as a photocopier.

These two characteristics of facsimile machines have given the applicant the idea of combining with them the above-mentioned equipment as terminals in order that they can enjoy some of the facilities of these facsimile machines.

The present invention relates to a facsimile machine of the type defined above which is characterized by the fact that it has means for direct connection to at least one terminal and means for connecting the terminal to the telephone line, and that, in case of connection between the terminal and the telephone line, it is adapted to note events on the line and therefore to recognize their nature and switch the line to the facsimile machine or the terminal as a function of the nature of the events.

By events there are understood frequency signal or data transmissions, for instance.

The terminal may be a videotext terminal sharing the telephone line with the facsimile machine and the telephone, and as the printer of the facsimile machine can serve for the videotext terminal, the latter need not have a printer of its own.

In such case, as the videotext terminal has a peripheral data connector, the facsimile machine can be connected directly to the terminal by said connector. When an extension telephone is connected in parallel on the telephone line upstream of the facsimile machine, the facsimile machine considers it also to be a terminal, within the meaning of the invention, in the sense that the facsimile machine is adapted, in case of an incoming call and the picking up of the receiver of the parallel extension phone, to enter into parallel intrusion, listen to the signals of the parallel phone and recognize their nature.

The facsimile machine may also be adapted to reverse the reception and transmission speeds of a videotext terminal, that is to say to control the terminal in "opposed" mode.

The terminal may be an answering and recording machine.

In such case, the facsimile machine may be so set up that in case of an incoming call, it connects with the telephone line only after a number of rings greater than that at the end of which the answering and recording machine connects its recording and playback means to the telephone line.

The facsimile machine advantageously has means for direct connection to several terminals.

The facsimile machine may be adapted to be disconnected from the telephone line and to disconnect the telephone line from an answering and recording machine.

The facsimile machine may also be adapted, in association with a telephone and a videotext terminal, and an answering-recording machine being connected to the telephone line, to switch the telephone line to the telephone and disconnect the answering/recording machine.

Figure 2:
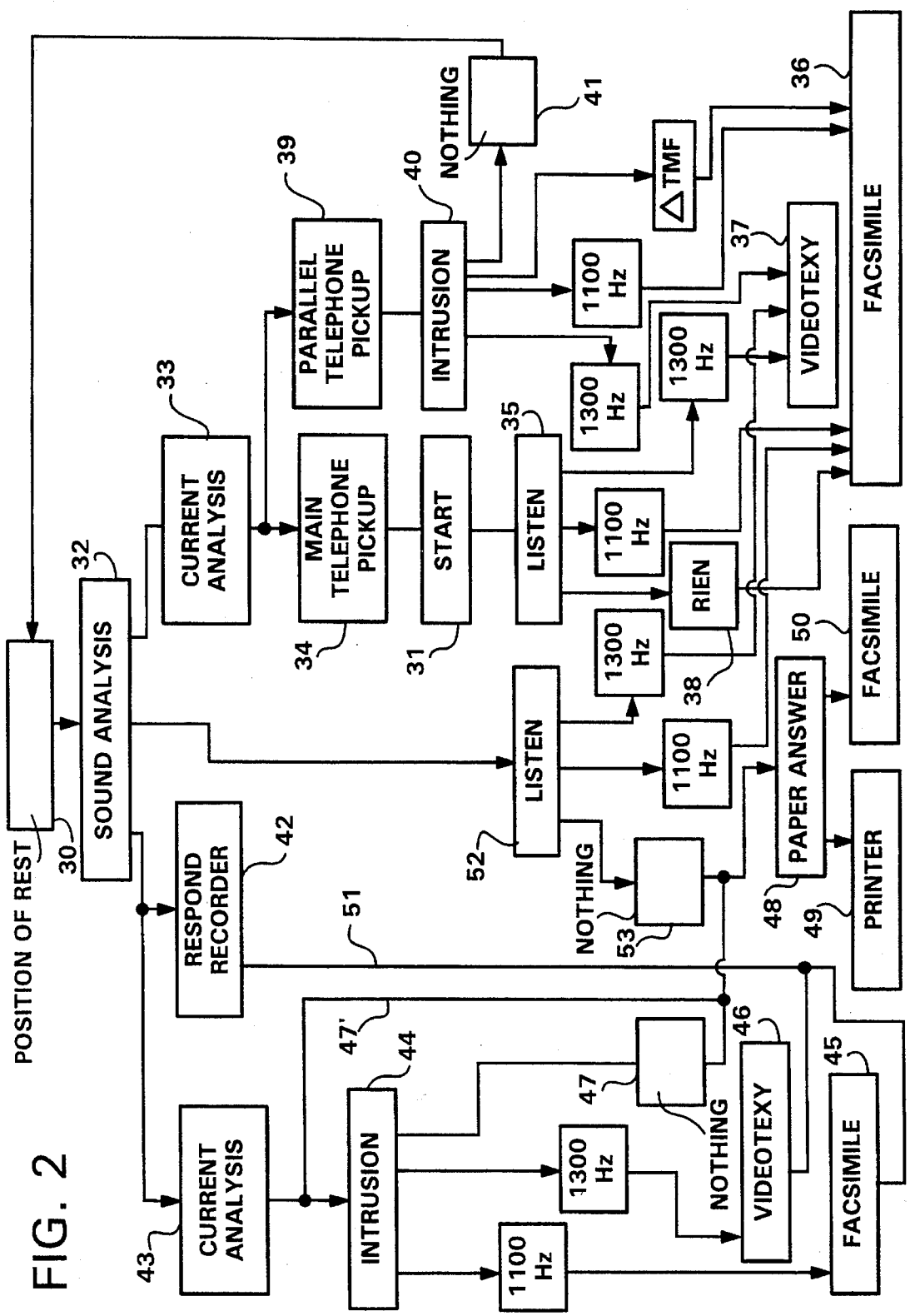

The invention will be better understood by means of the following description of the preferred embodiment of the facsimile machine of the invention, read with reference to the accompanying drawing, in which FIG. 1 is a structural schematic of the facsimile machine associated with a videotext terminal, an answering/recording machine, and a parallel extension phone, and FIG. 2 is an organization chart of the facsimile machine of FIG. 1.

Referring to FIG. 1, a facsimile machine 1 in accordance with the invention is associated here with three terminals, a videotext terminal 2, in the present case of Minitel make, which is well-known to those skilled in the art, in an ordinary version without printer, a recording/answering machine 3, entirely as conventional and well-known as the terminal 2, and a parallel extension phone 9. The terminal 2 is adapted to receive "screens" from a server center and display them. As elements of the videotext terminal 2 there have been shown in FIG. 1 only its processor 4, its modem 5, and a switch 6 for connection with a main telephone 7.

The facsimile machine is connected to a telephone line 8 and to the main telephone 7 via the terminal 2. The extension phone 9, which is connected in parallel to the line 8 "upstream" of the facsimile machine 1, in accordance with a conventional wiring, shares the line with the facsimile machine 1 and the associated main telephone 7. The order in which these apparatus are connected could, however, be different, for example line 8, terminal 2, facsimile machine 1, main telephone 7.

The facsimile machine 1 has a central processor 10 connected to a memory 11, an analysis module or scanner 12, a character generator 13, a printer 14, a "start" key 15, a "stop" key 16, a manual/automatic answer toggle switch 29, a module 17, with programmable filters, for recognizing the nature of the incoming calls in order to place the telephone/facsimile switching function in operation and, more generally, for the function of sorting the incoming calls, a modem 18, connected to the terminals of the secondary winding of a transformer 19, and other conventional elements of a facsimile machine, not necessary for an understanding of the invention and therefore not shown.

The recognition module 17 is adapted to recognize the 1100 Hz frequency of automatic dial facsimile machines, the 1300 Hz frequency (chopped or continuous) of automatic call videotext servers as well as the absence of voice signals. The telephone line 8 enters the facsimile machine 1 and can be directed, by a switch 20 controlled by the processor 10, either towards the modem 18 or towards the terminal 2 and the associated telephone 7. A call indicator or ring detector 21 is connected in parallel on the line 8 "upstream" of the switch 20, and a current detector 22, which can be connected in series with the terminal 2 and the telephone 7, between them and the switch 20, makes it possible to determine whether the telephone 7 is on line or at rest.

The processor 4 of the terminal 2 is connected to the processor 10 of the facsimile machine 1 by a peripheral data connector 23 of the terminal 2 and a peripheral data connector 23' of the facsimile machine 1. The answering/recording machine 3, to which a telephone 24 is also associated here, can be connected to the line 8 "upstream" of the switch 20 and, here, downstream of the detector 21, via a switch 25 and a second current detector 26 between the switch 25 and the answering/recording machine 3. A switch 27 in the answering/recording machine 3 makes it possible to connect the line either to a recording/playback member 28, indicated symbolically for the sake of simplicity by a cassette in FIG. 1, or to the telephone 24. In state of rest, the switch 20 is in the position shown in FIG. 1 which connects the line 8 to the terminal 2 and the switch 25 is in the position, shown in FIG. 1, which connects the line 8 to the answering/recording machine 3.

The facsimile machine 1 is adapted to sort the incoming calls.

When the user of the facsimile machine 1 is present, by actuating the toggle switch 29 he switches 30 the facsimile machine 1 to manual answer in order to disconnect it: The switch 20 remains in its position of rest and the switch 25 is activated in order also to disconnect the answering machine 3. In this condition, neither the facsimile machine 1 nor the answering machine 3 can answer incoming calls. It will be noted that answering/recording machines are provided with a manual/automatic answer switch control. But here, the switch controls of the two machines 1 and 3 are advisedly grouped together on the facsimile machine. In this condition, furthermore, the central phone 7 and the parallel phone 9 can be used in entirely normal fashion.

Referring to the flow chart of FIG. 2, if the incoming call is not a telephone or a voice call and the user having picked up the headset of the main phone 7, actuates 31 the "start" button 15, the switch 20 changing into the active position which connects the line 8 to the modem 18. Prior to this, by the ring analysis 32 by the detector 21 and the current analysis 33 by the detector 22, the picking up of the receiver of the main telephone 7 was noted 34 by the facsimile machine (processor 10). The facsimile machine remains on listen 35 for a few moments, in this case 5 seconds, and determines the nature of the call. It can come from an automatic dial facsimile machine or an automatic call videotext server.

In the former case, the 1100 Hz frequency having been detected by the recognition module 17, the processor 10 sees to it that the facsimile machine continues in facsimile 36; the switch 20 remains in active position and the standard T 30 protocol which governs exchanges between facsimile machines is placed in operation.

In the second case, the 1300 Hz frequency having been detected by the module 17, the processor 10 switches the switch 20 into position of rest after having, by the peripheral data connector 23 and the processor 4, caused the switch 6 of the terminal 2 to move into the position connecting the line 8 to the modem 5. The facsimile machine thus continues, by analogy with the expressions telephony and telecopy, in a mode which can be designated by the neologism "videotexy" 37. The terminal 2 is in communication on the line 8 and the facsimile machine 1 observes the flow of information over the peripheral data connectors 23 and 23', searching for possible high-level applications which might concern it, such as, for instance, a screen print or a graphical transfer.

In a third case 38, no particular frequency has been detected by the end of 5 seconds and the facsimile machine continues also in facsimile 36.

If the incoming call is a non-voice call, and the user has picked up 39 the headset of the parallel phone 9, the off hook condition of the parallel phone 9 has been noted by the processor 10 of the facsimile machine by ring analysis 32 (the ring disappeared) and current analysis 33 (the detector 22 is not activated). The facsimile machine passes in parallel intrusion 40, by movement of the switch 20 into active position, to listen to the signals of the parallel phone 9, the nature of which it determines. There may be concerned DTMF (dual-tune multifrequency) remote-control signals and telecommunication data signals sent out by the user by means of a button on the parallel phone 9 and which can be recognized by the filters of the recognition module 17.

The user need then merely hang up the parallel phone 9 before the facsimile machine continues in the application recognized.

In the event of the detection of a frequency of 1100 Hz, the facsimile machine continues in facsimile 36; in the event of detection of a frequency of 1300 Hz, it continues in videotexy 37; in the case of a DTMF signal, the facsimile machine can continue in facsimile 36. If none of the above signals has been detected 41 at the end, for instance, of 15 seconds, the switch 20, in the example considered, is moved into the position of rest 30, the facsimile machine believing that the parallel phone 9 is remaining in voice communication over the line.

Up to now, we have discussed the functions of the facsimile machine which assure the distinguishing between voice, facsimile and data signals.

When the user of the facsimile machine 1 is absent, he switches the facsimile machine, by means of the toggle switch 29, to automatic answer, which has the effect of placing the switch 25 in position of rest and of connection with the answering/recording machine 3, the switch 20 being in position of rest 30.

The answering/recording machine 3, which is of conventional type, has a call detector (not shown) which makes it possible, if the user has not taken up the receiver by the end of m rings, to have the switch 27 connected with the recording/playback member 28.

The facsimile machine 1, upon placing in operation, is controlled so that in case of an incoming call, it answers, that is to say takes up the call, only after n rings, n being greater than m. When the answering/recording machine 3 is in operation and at the end of m rings, by a conventional message, it receives the incoming call 42, this situation is detected by the processor 10 of the facsimile machine 1, by a number of rings less than n 32 and the activation 43 of the current detector 26, the facsimile machine 1 passes into parallel intrusion monitoring mode 44, by movement of the switch 20 into active position, to listen to the signals of the answering/recording machine 3.

In the case of voice message, it is received 42 on the recording member 28 of the answering/recording machine 3, In case of the detection of a frequency of 1100 Hz, the facsimile machine continues in facsimile 45, the switch 20 remaining in active position; in case of the detection of a frequency of 1300 Hz, it continues in videotexy 46, by the movement of the switch 20 back into position of rest and appropriate control of the videotext terminal 2 by the peripheral data connectors. In both cases, the processor 10 of the facsimile machine moves the switch 25 back into active position in order to disconnect 51 the answering/recording machine 3, which will return by itself into position of rest shortly thereafter. When the caller does not leave a voice message 47, or when a voice message has actually been received by the answering/recording machine 3 which has hung up and the sequence of which has terminated 47', this situation is noted by the facsimile machine, after a silence in this case of about 8 seconds or by the deactivating of the detector 26, and the facsimile machine can try to place a mode of operation known as "paper answer" into operation 48.

The videotext terminal 2, in its connection with the telephone line 8, normally receives the information from the server at a high speed (1200 bauds) and gives off its data at a slow speed (75 bauds). The processor 4 of the terminal 2 is adapted to reverse the speeds of reception and transmission of the terminal; in "opposed mode" the sending out of information by the terminal 2 takes place at high speed and the receiving of information at slow speed.

The carrier frequency of the high-speed channel of the terminal 2 is in this case 1300 Hz and that of the slow channel 390 Hz. The T 30 protocol referred to above defines, in particular, standard fields and in particular a DIS (digital identification signal) field which permits a facsimile machine which has been called to announce its standard properties (characteristics of its modem, coding, speed, format, capacity to be noted, etc.). Therefore, upon an attempt to place the "paper answer" mode into operation via the peripheral data connector 23 of the terminal 2, the facsimile machine 1, the switch 20 of which was still in active position of intrusion, causes the connecting of the terminal 2 to "opposed mode" and the movement of the switch 20 into position of rest and of connection with the terminal 2, and awaits the return carrier, therefore 390 Hz.

In the event of reception of this return carrier within a period of times of in this case 12 seconds, the message is taken up 49 on the printer 14 of the facsimile machine 1 via the terminal 2 and the peripheral data connector 23; hence the name "paper answer" for this application. If the return carrier does not "converge" at the end of the period of time in question, the facsimile machine undertakes 50 a final attempt to place the facsimile mode into operation, moves the switch 20 into active position, and sends DIS fields for, in this case, 35 seconds.

The tentative paper-answer 48 is not obligatory and, when the calling party has not left a voice message 47, the facsimile machine directly undertakes a last attempt to enter facsimile mode. A chance has therefore been given for all applications including, last of all, manual-call facsimile without frequency of 1100 Hz of automatic dial facsimile machines. The first has been given to the answering/recording machine 3, the second and third to the reception of a message from an automatic dial facsimile machine (1100 Hz) or a videotext server (1300 Hz), the fourth to the paper answer, and the fifth to the reception of a message from a manual call facsimile machine.

On the operating plane, still in the event that the answering/recording machine is in operation and that it receives an incoming call at the end of m rings, the answering message of the answering/recording machine 3 invites the caller to leave a voice message, or to send a fax by turning on his facsimile machine or a videotext message by depressing the connection button on his terminal.

In the case of a spoken message recorded on the answering/recording machine 3, attempts at paper answer and facsimile will be carried out after the caller has hung up and without his knowing anything about this.

If the caller is equipped with a videotext terminal, after the acceptance message, he can depress the connection button of his terminal, seeking for the 1300 Hz carrier frequency, which creates the 8 second silence at the end of which the facsimile machine 1 turns on the paper-answer mode.

If the caller is the user of a facsimile machine, he places his facsimile machine in facsimile mode, the placing in operation of which will be delayed by the paper answer attempt of the facsimile machine which has been called, but will nevertheless be effected before the watchdog of his facsimile machine 1, which is a standard time delay.

Automated calls, characterized by signal a frequency of 1100 or 1300 Hz, are detected immediately by the recognition module 17, the facsimile machine 1 being in parallel intrusion monitoring mode, and are switched accordingly.

If nothing has happened by the end of n rings, this means that there is no answering machine or that there is one but it is unavailable or disconnected. In such case, the facsimile machine 1 takes the call by moving the switch 20 into active position and proceeds with silent listening 52, in this case for 5 seconds. In the event of the detection of a frequency of 1100 Hz, the facsimile machine 1 continues in facsimile 36; in the event of detection of a frequency of 1300 Hz, it continues in videotexy 37 by the moving of the switch 20 back into position of rest. If by the end of 5 seconds, no signal has been detected 53, the facsimile machine 1 makes an attempt at paper answer 48, as in the case of the giving off of an acceptance message by the answering/recording machine 3.

If, although the installation is in automatic answer mode, the user returns and picks up the phone before the answering/recording machine or the facsimile machine has answered (m or n rings), the facsimile machine 1 behaves as though in manual answer. If a telephone call is not concerned and he has picked up the receiver of the main phone 7, he can "pass over" by actuating the start button 15. If he has picked up the receiver of the parallel phone 9, he can pass over to the facsimile machine 1, allowing the data signals to pass or by actuating the DTMF data button key and then hanging up.

The answering/recording machines on the market generally permit listening over a loudspeaker and the resumption of communication by the user on the associated phone (24), which resumption is detected by the machine and causes it to return to rest position. With the facsimile machine which has just been described, this possibility is also present; however, one can save the expense of the associated phone 24. For this purpose, one provides for effecting the resumption of the communication on the main phone 7 by actuating the stop button 16 of the facsimile machine 1. The latter then leaves the state of parallel intrusion in which it was, with change of the switch 20 into position or rest, activation of the current detector 22, and, the time of the communication, activation of the switch 25 to disconnect the answering/recording machine 3 which is then placed in state of rest.

The parallel intrusions 40 and 44 in the monitoring mode have been described as a connection of the facsimile machine to the line by activation of the switch 20. This is possible but it has the slight drawback of slightly weakening the speech signals and taking up a part of the line current. An intrusion in high impedance avoids this drawback. It can be effected, for instance, by actuating, in states 40 and 44, not only the switch 20 but also two other switches, not shown, one cutting the path of the line current by cutting off the resistor 60 located between the transformer 19 and the switch 20 and the other switching the adaptation resistor of the modem 18 from the normal value to a high value.

With respect to outgoing calls, each of the apparatus of the combination can, at will, connect with the line 8 if it is free. The videotex terminal 2 can obtain it unless the facsimile machine 1 is on line, the switch 20 being in active position. The facsimile machine 1 abstains from proceeding with outgoing calls if the detectors 22, 26 are activated. When the facsimile machine 1 attempts an outgoing call, it makes certain of the presence of the invitation to dial tone and, if it does not have it, hangs up rapidly, for instance if the parallel phone 9 is on line. The phone 24, associated here with the answering/recording machine 3, can connect with the line if the facsimile machine 1 has not done so; this normally results in a stopping of the recording/playback function 28 in the event of recording. The parallel phone 9 can connect with the line at any moment, but the user must detect by himself a pending data communication and then hang up promptly.

Different circumstances have been described in which the paper answer application was attempted, in close connection with a subsequent attempt at facsimile. One can obviously deduce from this restricted configurations in which either paper answer would not be offered; one could therefore directly go to attempted facsimile or facsimile would not be offered in this stage.

Paper answer as well as another interesting application made possible by the combination with the videotex terminal, namely the facsimile editor, will now be described in more detail.

Let us take, therefore, the facsimile machine 1 and videotex terminal 2 of FIG. 1. When the user is absent and an incoming call arrives on the line 8, the facsimile machine 1 connects with the line and determines if the call is intended for an application which it can recognize. Otherwise, if the incoming call coming from a videotex terminal, the facsimile machine 1 proceeds to make a paper answer attempt. For this purpose, it causes, on the one hand, the movement of the switch 20 into position of rest and, on the other hand, via the peripheral data connectors 23', 23 the grasping of the line by the videotex terminal 2 and the inversion of its speeds of transmission and reception.

Still via the connectors 23', 23 the facsimile machine causes the videotex terminal to behave as server by transmitting on line a welcome screen supplied by the facsimile machine. The caller, detecting the carrier of the fast channel of the terminal 2, connects his own videotext terminal, receives the welcome screen from the terminal 2 which invites him to type a message on the keyboard of his videotex terminal. The videotex terminal 2 receives this message which, via the connectors 23, 23', is taken up by the facsimile machine 1. Due to the character generator 13 which supplies an image of this message, the message is printed on the printer 14 of the facsimile machine 1. In this application, the facsimile machine serves as a data answerer/recorder which the user, upon his return, can consult directly without any manipulation.

The combination of the facsimile machine 1 and the videotex terminal 2 also makes the facsimile editor application possible. Under the control of the processor 10, via the connectors 23, 23', the user, by means of the keyboard and the screen of the terminal 2, can enter a message on the terminal 2, which message is stored by the facsimile machine before being converted into image elements (pixels) and transmitted in facsimile to a correspondent user of another facsimile machine. In this application, the user uses only the screen and keyboard of the videotex terminal, the facsimile and terminal assembly being operated in word-processing.

The facsimile machine which has just been described in all its applications is a multifunctional facsimile machine.

A facsimile machine has been described which is integrated in a chain consisting of telephone line—facsimile machine—videotex terminal—telephone. These apparatus could also be integrated differently, for instance in a chain consisting of telephone line—videotex terminal facsimile machine—telephone.

I claim:

1. A call director apparatus including a facsimile machine, said apparatus having a processor having means for connecting a telephone line, means for connecting at least one main telephone, a call detector, and a module for detecting events indicating the nature of incoming calls, said apparatus comprising:

means for directly connecting the processor to at least one terminal; and means for connecting said terminal to the telephone line, so that, only in the event of a connection between the terminal and the telephone line, is the processor connected to the terminal to monitor events on the telephone line, so as to determine their nature, and to switch the telephone line to the facsimile machine or to the terminal as a function of the events occurring during said connection.

2. Apparatus according to claim 1, further comprising an extension phone connected in parallel with the processor to the telephone line, so that the processor monitors events during calls received by said extension phone, so as to determine their nature.

3. Apparatus according to claim 1, wherein said at least one terminal comprises an answering/recording machine and the apparatus further comprises said answering/recording machine directly connected to the processor.

4. Apparatus according to claim 3, wherein said direct connection includes a switch alternately connecting the telephone line to the processor or the main telephone, and a second current detector.

5. Apparatus according to claim 4, in which the processor is adapted to control the switch and to disconnect the answering/recording machine from the telephone line.

6. Apparatus according to claim 3, wherein the answering/recording machine comprises a recording/playback member adapted to be connected to the telephone line in response to an incoming call only after a number of rings greater than a given number.

7. Apparatus according to claim 1, further comprising an answering/recording machine, connected to the telephone line; and means for switching the telephone line to the main telephone and disconnecting said answering/recording machine.

8. A call director apparatus including a facsimile machine, said apparatus having a processor having means for connecting a telephone line, means for connecting at least one main telephone, a call detector, and a module for detecting events indicating the nature of incoming calls, said apparatus comprising:

means for directly connecting the processor to at least one terminal; and means for connecting said terminal to the telephone line, so that, in the event of a connection between the terminal and the telephone line, the processor is connected to the terminal to monitor events on the telephone line, so as to determine their nature, and to switch the telephone line to the facsimile machine or to the terminal as a function of the events occurring during said connection, wherein said at least one terminal comprises a videotex terminal and the apparatus further comprises said videotex terminal directly connected to the processor.

9. Apparatus according to claim 8, in which said direct connection means includes a connector adapted to connect the processor to a peripheral data connector of said videotex terminal.

10. Apparatus according to claim 8, further comprising means for reversing the speeds of transmission and reception of the videotex terminal.

11. Apparatus according to claim 10, said apparatus further comprising:

printer means;

an answering/recording machine;

means for switching a connection between the telephone line and the answering/recording machine to connect the telephone line to the videotex terminal when no signal is detected on the telephone line or the hanging up of the answering/recording machine is detected while the telephone line is connected to the answering/recording machine, and reversing the speeds of transmission and reception of the videotex terminal in order to be able to receive a message on the printer means via the means of direct connection between the facsimile machine and the videotex terminal.

12. Apparatus according to claim 8, further comprising a first current detector connected to detect current in the means for connecting the main telephone to the telephone line.

13. Apparatus according to claim 8, said apparatus further comprising:

printer means; and means for switching a connection between the telephone line and the facsimile machine to connect the telephone line to the videotex terminal in the event no signal is detected while said telephone line is connected to said facsimile machine, and for reversing the speeds of transmission and reception of the videotex terminal in order to receive a message on the printer means via the means of direct connection between the processor and the videotex terminal.

14. Apparatus according to claim 13, further comprising means for supplying the videotex terminal with a message and causing the videotex terminal to transmit the message on line.

15. Apparatus according to claim 8, further comprising means for providing text to the videotex terminal, means for converting said text into image elements, and means for printing said text or transmitting said text in facsimile.

* * * * *